(12) United States Patent
Sun et al.

(10) Patent No.: US 9,658,336 B2
(45) Date of Patent: May 23, 2017

(54) PROGRAMMABLE CURRENT SOURCE FOR A TIME OF FLIGHT 3D IMAGE SENSOR

(71) Applicant: OMNIVISION TECHNOLOGIES, INC., Santa Clara, CA (US)

(72) Inventors: Tianjia Sun, Santa Clara, CA (US); Rui Wang, San Jose, CA (US); Tiejun Dai, Santa Clara, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 492 days.

(21) Appl. No.: 14/464,453

(22) Filed: Aug. 20, 2014

(65) Prior Publication Data

US 2016/0054447 A1    Feb. 25, 2016

(51) Int. Cl.
  *G01S 17/89* (2006.01)
  *G01S 17/10* (2006.01)
  *G01S 7/486* (2006.01)

(52) U.S. Cl.
  CPC ........... *G01S 17/89* (2013.01); *G01S 7/4863* (2013.01); *G01S 17/10* (2013.01)

(58) Field of Classification Search
  CPC ........... G11C 7/062; G11C 7/067; G11C 7/08; G11C 27/02; G11C 2207/063
  See application file for complete search history.

(56) References Cited

U.S. PATENT DOCUMENTS

| | | | |
|---|---|---|---|
| 5,296,752 | A | 3/1994 | Groeneveld et al. |
| 7,542,085 | B2 | 6/2009 | Altice, Jr. et al. |
| 8,686,367 | B2 | 4/2014 | Shah |
| 2006/0007422 | A1 | 1/2006 | Dimsdale |

(Continued)

FOREIGN PATENT DOCUMENTS

| | | |
|---|---|---|
| CN | 101027574 A | 8/2007 |
| CN | 202443121 U | 9/2012 |

(Continued)

OTHER PUBLICATIONS

CN Patent Application No. 201410820446.9—Chinese Office Action and Search Report, issued Nov. 22, 2016, with English Translation, 20 pages.

(Continued)

*Primary Examiner* — Luke Ratcliffe
(74) *Attorney, Agent, or Firm* — Blakely Sokoloff Taylor & Zafman LLP

(57) ABSTRACT

A programmable current source for use with a time of flight pixel cell includes a first transistor. A current through the first transistor is responsive to a gate-source voltage of the first transistor. A current control circuit is coupled to the first transistor and coupled to a reference current source to selectively couple a reference current of the reference current source through the first transistor during a sample operation. A sample and hold circuit is coupled to the first transistor to sample a gate-source voltage of the first transistor during the sample operation. The sample and hold circuit is coupled to hold the gate-source voltage during a hold operation after the sample operation substantially equal to the gate-source voltage during the sample operation. A hold current through the first transistor during the hold operation is substantially equal to the reference current.

29 Claims, 6 Drawing Sheets

(56) References Cited

U.S. PATENT DOCUMENTS

| | | | |
|---|---|---|---|
| 2010/0194956 A1* | 8/2010 | Yuan | H04N 5/35527 |
| | | | 348/308 |
| 2013/0181119 A1 | 7/2013 | Bikumandla et al. | |
| 2013/0329234 A1 | 12/2013 | Murakami et al. | |
| 2014/0160461 A1 | 6/2014 | Van Der Tempel et al. | |
| 2015/0063048 A1* | 3/2015 | Lin | G11C 7/062 |
| | | | 365/210.1 |

FOREIGN PATENT DOCUMENTS

| | | |
|---|---|---|
| CN | 102710907 A | 10/2012 |
| CN | 103748479 A | 4/2014 |
| TW | 201306647 A | 2/2013 |
| TW | 201339644 A | 10/2013 |
| WO | WO 2006/086281 A2 | 8/2006 |
| WO | WO 2012/115083 A1 | 8/2012 |

OTHER PUBLICATIONS

TW Patent Application No. 103138807—Taiwanese Office Action and Search Report, issued Jun. 1, 2016, with English Translation, 6 pages.

* cited by examiner

PROGRAMMABLE CURRENT SOURCE FOR A TIME OF FLIGHT 3D IMAGE SENSOR

BACKGROUND INFORMATION

Field of the Disclosure

This invention is related to image sensors. In particular, embodiments of the present invention are related to three dimensional image sensors.

Background

Interest in three dimensional (3D) cameras is increasing as the popularity of 3D applications continues to grow in applications such as imaging, movies, games, computers, user interfaces, and the like. A typical passive way to create 3D images is to use multiple cameras to capture stereo or multiple images. Using the stereo images, objects in the images can be triangulated to create the 3D image. One disadvantage with this triangulation technique is that it is difficult to create 3D images using small devices because there must be a minimum separation distance between each camera in order to create the three dimensional images. In addition, this technique is complex and therefore requires significant computer processing power in order to create the 3D images in real time.

For applications that require the acquisition of 3D images in real time, active depth imaging systems based on the optical time of flight measurement are sometimes utilized. Time of flight systems typically employ a light source that directs light at an object, a sensor that detects the light that is reflected from the object, and a processing unit that calculates the distance to the object based on the round trip time that it takes for light to travel to and from an object. In typical time of flight sensors, photodiodes are often used because of the high transfer efficiency from the photo detection regions to the sensing nodes. Separate circuitry is coupled to the photodiodes in each pixel cell to detect and measure the light that is reflected from the object.

However, a continuing challenge with the acquisition of 3D images using time of flight systems is that there are pixel-by-pixel variations in the separate circuitry coupled to the photodiodes in each pixel cell. For instance, it is not unusual for there to be approximately 5% differences between pixel cell current mirror outputs across a time of flight sensor due to pixel-by-pixel variations that may occur in the sensors. These pixel-by-pixel variations in current mirror outputs consequently reduce the accuracy and reliability of time of flight sensors.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
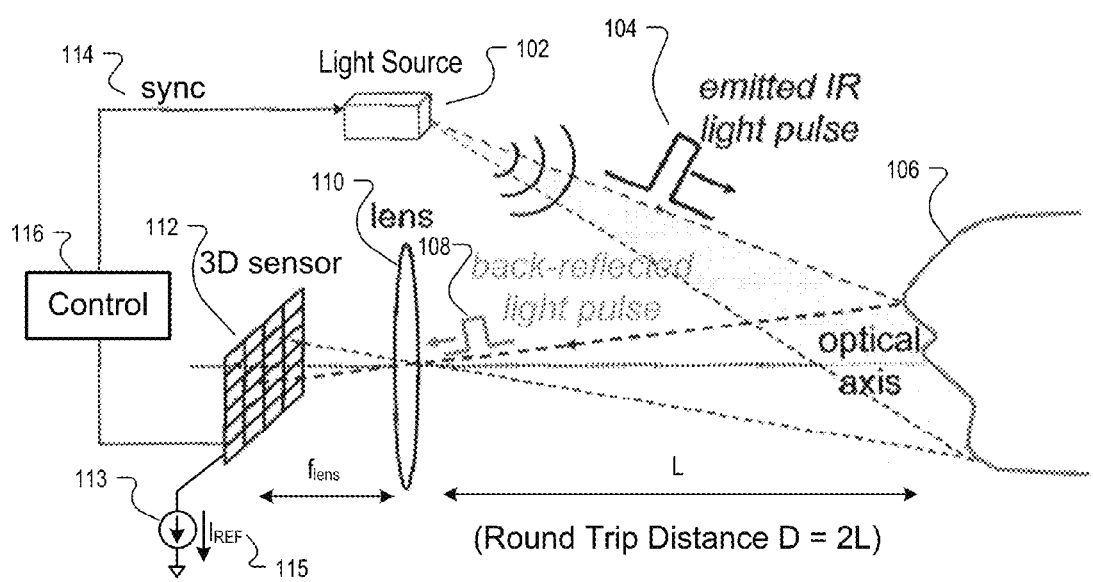
FIG. 1 is a block diagram that shows one example of a time of flight sensing system in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Methods and apparatuses for programming current sources with a single reference current source in time of flight pixel cells of a 3D time of flight sensor are disclosed. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise. For example, the term "or" is used in the inclusive sense (e.g., as in "and/or") unless the context clearly indicates otherwise.

As will be shown, examples of a time of flight sensing system including time of flight pixel cells are disclosed. In various examples, time of flight pixel cells in accordance with the teachings of the present invention include programmable current sources that are programmed using the same single current reference source. As a result, each of the individual current sources that are included in the pixel support circuit of each time of flight pixel cell provide a substantially equal current for each pixel cell, even with pixel-by-pixel variations that may occur between matched transistors across the entire time of flight pixel cell array in accordance with the teachings of the present invention.

To illustrate, FIG. 1 is a block diagram that shows one example of a time of flight sensing system 100 in accordance with the teachings of the present invention. As shown, time of flight sensing system 100 includes a light source 102 that emits light pulses, which are illustrated as emitted light 104 in FIG. 1. As shown, emitted light 104 is directed to an object 106. In one example, emitted light 104 includes pulses of infrared (IR) light. It is appreciated that in other examples, emitted light 104 may have wavelengths other than infrared, such as for example visible light, near-infrared light, etc., in accordance with the teachings of the present invention. Emitted light 104 is then reflected back from object 106, which is shown as back reflected light 108 in FIG. 1. As shown, reflected light 108 is directed from object 106 through a lens 110 and is then focused onto a time of flight pixel array 112. In one example, time of flight pixel array 112 includes a plurality of time of flight pixel cells arranged in a two dimensional array. A sync signal 114 is generated by control circuitry 116 coupled to time of flight pixel array 112, which synchronizes the pulses of emitted light 104 with corresponding signals that control the plurality of pixel cells in time of flight pixel array 112, which sense the reflected light 108, in accordance with the teachings of the present invention.

In the example depicted in FIG. 1, it is noted that time of flight pixel array 112 is positioned at a focal length $f_{lens}$ from lens 110. As shown in the example, the light source 102 and the lens 110 are positioned a distance L from the object. In one example, it is noted that lens 110 may be implemented with a plurality of microlenses that are integrated into time of flight pixel array 112. It is appreciated of course the FIG. 1 is not illustrated to scale and that in one example, the focal length $f_{lens}$ is substantially less than the distance L between lens 110 and object 106. Therefore, it is appreciated that for the purposes of this disclosure, the distance L and the distance L+focal length $f_{lens}$ are substantially equal for purposes of time of flight measurements in accordance with the teachings of the present invention. In addition, it is also appreciated that for the purposes of this disclosure, the distance between the light source 102 and the object 106, and the distance between the object 106 and the lens 110, are also both substantially equal to L for purposes of time of flight measurements in accordance with the teachings of the present invention. Accordingly, the distance between the light source 102 and the object 106 (and/or the distance between the object 106 and the lens 110) is equal to half of the round trip distance, e.g., D, which is therefore equal to 2×L. In other words, it is assumed that the distance L from light source 102 to the object 106, plus the distance L back from the object 106 to the lens 110, is equal to the round trip distance D (or 2×L) in accordance with the teachings of the present invention.

In the depicted example, there is a delay time between the emission of a light pulse of emitted light 104 and the receipt of that light pulse in reflected light 108, which is caused by the amount of time that it takes for the light pulse to travel the distance L from light source 102 to object 106, and then the additional time it takes for the corresponding reflected light pulse 108 to travel the distance L back from object 106 to pixel array 112. The delay time between emitted light 104 and reflected light 108 represents the time of flight for the light pulses to make the round trip between the light source 102 and object 106. Once the time of flight (i.e., TOF) is known, the distance L from light source 102 to object 106 can be determined using the following relationships in Equations 1 and 2 below:

$$TOF = \frac{2 \times L}{c} \quad (1)$$

$$L = \frac{T_{TOF} \times c}{2} \quad (2)$$

where c is the speed of light, which is approximately equal to $3 \times 10^8$ m/s, and TOF is the amount of time that it takes for the light pulse to travel to and from the object as shown in FIG. 1.

Figure 2:
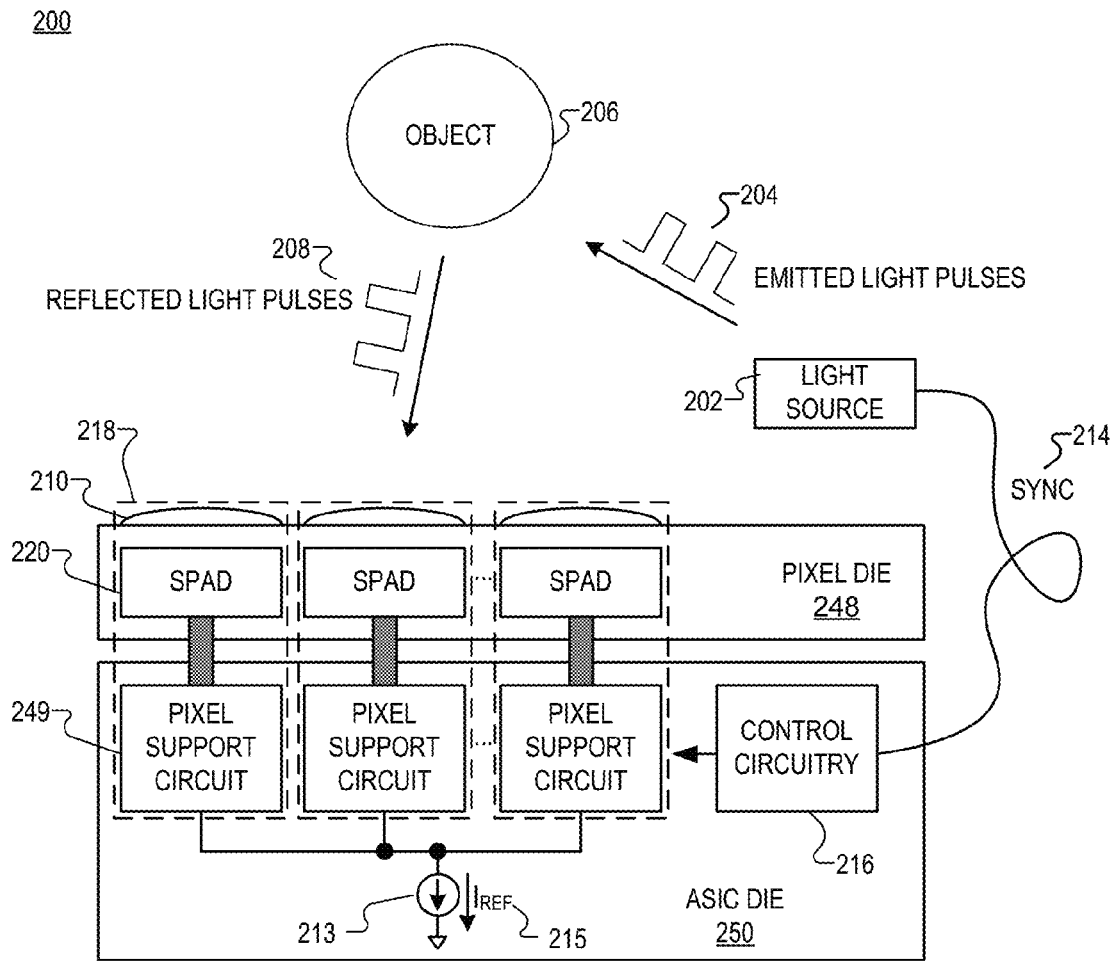
FIG. 2 is a block diagram that shows an example of a cross-section of time of flight sensing system implemented with a pixel die coupled to an application specific integrated circuit (ASIC) die in a stacked chip scheme in accordance with the teachings of the present invention.

FIG. 2 is a block diagram that shows an example of a cross-section of time of flight sensing system 200 implemented with a pixel die 248 coupled to an application specific integrated circuit (ASIC) die 250 in a stacked chip scheme in accordance with the teachings of the present invention. It is appreciated that time of flight sensing system 200 of FIG. 2 may be one example of time of flight sensing system 100 of FIG. 1, and that similarly named and numbered elements referenced below are therefore coupled and function similar to as described above.

In the example depicted in FIG. 2, time of flight sensing system 200 includes pixel die 248 is coupled to ASIC die 250 in a stacked chip scheme as illustrated. As shown, time of flight sensing system 200 includes a light source 202 that emits light pulses 204, which are directed to an object 206. In one example, emitted light 204 includes pulses IR light. The emitted light pulses 204 are then reflected back from object 206, which are shown as reflected light pulses 208 in FIG. 2 in the depicted example.

In one example, time of flight sensing system 200 also includes pixel die 248, which includes a plurality of pixel cells, including pixel cell 218, arranged in a time of flight pixel array. In the example, each pixel cell 218 includes a photosensor 220, which in the illustrated example includes a single photon avalanche diode (SPAD) that is optically coupled to receive reflected light pulses 208 from object 206 through a respective microlens 210 as shown. Each photosensor 220 of each pixel cell 218 is coupled to corresponding pixel support circuit 249, which as shown in the illustrated is disposed in ASIC die 250.

As shown in the depicted example, the pixel support circuit 249 of each pixel cell 218 is also coupled to a single reference current source 213 included in ASIC die 250. As will be described in greater detail below, reference current source 213 is coupled to provide a reference current $I_{REF}$ 215 for each pixel support circuit 249 to program an internal programmable current source included in each pixel support circuit 249. Since the same reference current $I_{REF}$ 215 is used by each pixel support circuit 249, the current provided by each internal programmable current source included in each pixel support circuit 249 is individually calibrated to be substantially equal, even with pixel-by-pixel variations that may occur across all of the transistors that are included in all of the pixel support circuits 249 in accordance with the teachings of the present invention.

In one example, control circuitry 216 is also included in ASIC die 250 and is coupled to provide sync signal 214 to synchronize the pulses of emitted light 204 with corresponding signals that control the plurality of pixel cells 218, which sense the reflected light 208, in accordance with the teachings of the present invention.

Figure 3:
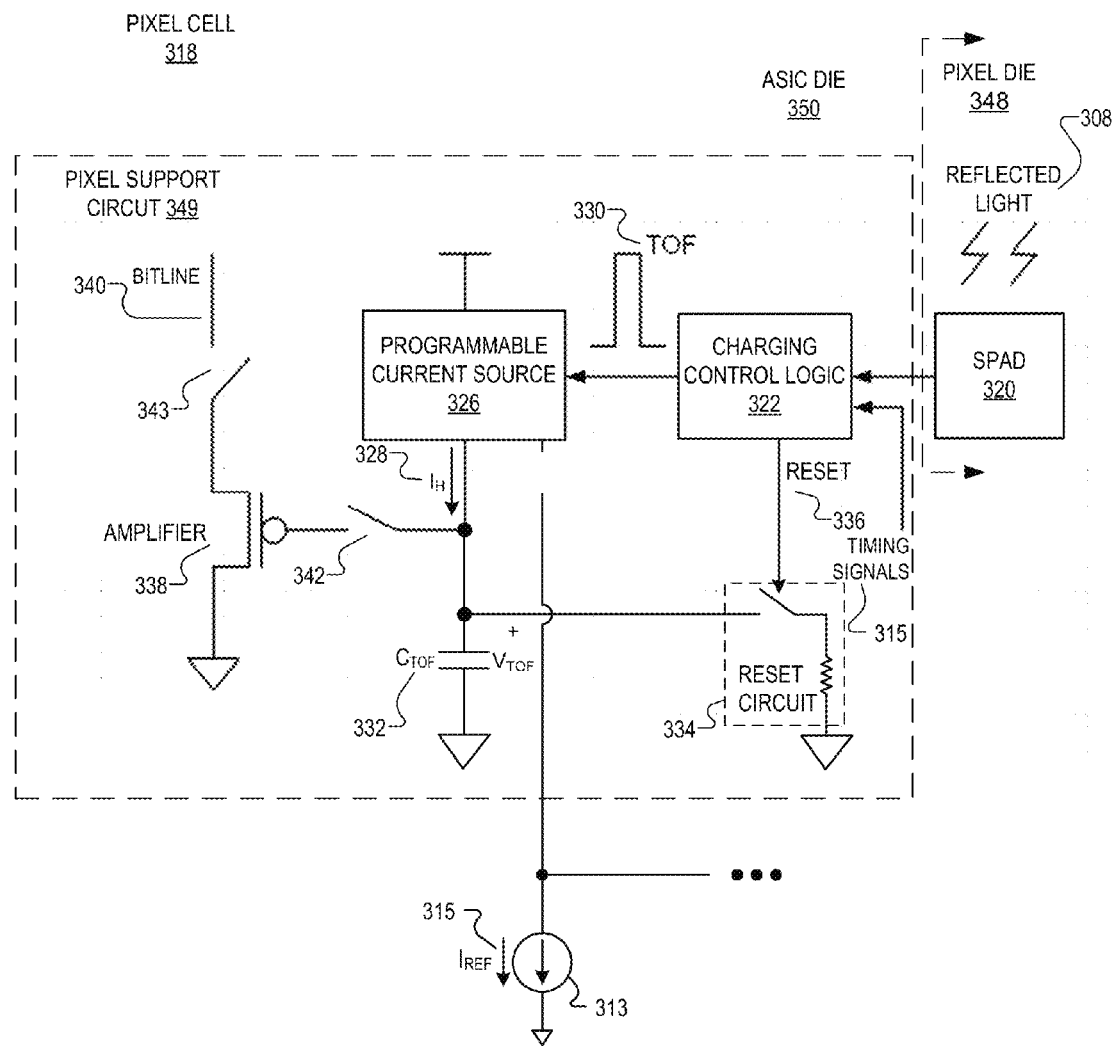
FIG. 3 is a schematic illustrating one example of a time of flight pixel in accordance with the teachings of the present invention.

FIG. 3 is a schematic illustrating one example of a time of flight pixel cell 318 in accordance with the teachings of the present invention. It is appreciated that pixel cell 318 may be one example of one of the plurality of pixels included for example in time of flight pixel array 112 of FIG. 1, or one of the plurality of pixel cells 218 included in FIG. 2, and that similarly named and numbered elements referenced below are therefore coupled and function similar to as described above. As shown in the depicted example, pixel cell 318 includes a photosensor 320 and pixel support circuit 349. Pixel support circuit 349 includes charging control logic 322, programmable current source 326, capacitor $C_{TOF}$ 332, reset circuit 334, output switch 342, row select switch 343 and amplifier 338. Photosensor 320 senses photons of reflected light 308, which are reflected from an object, such as for example object 106 of FIG. 1. In one example, photosensor 320 may include a single photon avalanche diode (SPAD), as shown in FIG. 3.

In the example, charging control logic 322 is coupled to the photosensor 320 to detect when the photosensor 320 senses the photons of reflected light 308 that are reflected from the object. Charging control logic 322 is further coupled to receive timing signals 315, which in the example may be representative of when light pulses 204 are emitted from the light source 202 to the object 206, as illustrated for example in FIG. 2, and therefore enable pixel cell 318 to be synchronized with light source 202 in accordance with the teachings of the present invention.

As shown in the depicted example, a programmable current source 326 is coupled to provide a constant current $I_H$ 328 in response to a time of flight (TOF) signal 330 coupled to be received from the charging control logic 322. In the example, the time of flight signal 330 is generated by charging control logic 322, and is representative of the time of flight for the round trip travel of each one of the light pulses 204 emitted from the light source 202 until the photosensor 320 senses a respective one of the photons of the reflected light 308 reflected from the object 206 in accordance with the teachings of the present invention.

In the example, an energy storage device illustrated for example as a time of flight capacitor $C_{TOF}$ 332 is coupled to be charged by the constant current $I_H$ 328 received from the programmable current source 326 in response to the time of flight signal 330. As shown in the depicted example, programmable current source 326 is coupled to a single reference current source 313. In the example, the single reference current source 313 is coupled to provide a reference current 315, which is utilized by all of the pixel cells 318 included in the time of flight pixel array, to program each respective programmable current source 326 and therefore calibrate each respective current $I_H$ 328 to be substantially equal across all pixel cells 318 included in the time of flight pixel array in accordance with the teachings of the present invention.

In the depicted example, the programmable current source 326 is coupled to provide the constant current $I_H$ 328 to charge the capacitor 332 beginning from when each light pulse 204 is emitted from the light source 202 until the photosensor 320 senses a respective one of the photons of reflected light 308 reflected from the object 206 in accordance with the teachings of the present invention. As a result, a voltage $V_{TOF}$ accumulated on the capacitor $C_{TOF}$ 332 is representative of a round trip distance D to the object 106 in accordance with the teachings of the present invention. In one example, a reset circuit 334 is coupled to capacitor $C_{TOF}$ 332 to reset the accumulated voltage $V_{TOF}$ on the capacitor $C_{TOF}$ 332 in response to a reset capacitor signal 336 after the accumulated voltage $V_{TOF}$ has been read out from capacitor $C_{TOF}$ 332 in accordance with the teachings of the present invention.

As shown in the example, pixel cell 318 also includes an amplifier 338 that is coupled to the capacitor $C_{TOF}$ 332 through an output switch 342 to read out the voltage $V_{TOF}$ accumulated on the capacitor $C_{TOF}$ 332 after being read in response to the time of flight signal 330. In the example, the reset circuit 334 is coupled to reset the voltage $V_{TOF}$ accumulated on the capacitor $C_{TOF}$ 332 after the voltage $V_{TOF}$ on the capacitor $C_{TOF}$ 332 has been read out in accordance with the teachings of the present invention. In one example, the amplifier 338 is a source follower coupled transistor as shown, and the output switch 342 is coupled between the capacitor $C_{TOF}$ 332 and the gate of the transistor of amplifier 338. In one example, pixel cell 318 also includes a row select switch 343 coupled between an output of the amplifier 338 and a bitline 340, through which the output of pixel cell 318 may be read out in accordance with the teachings of the present invention.

As illustrated in the example depicted in FIG. 3, it is noted that pixel cell 318 may be implemented in a stacked chip scheme. For instance, as shown in the example, photosensor 320 may be included in a pixel die 348, while pixel support circuit 349 of pixel cell 318 illustrated in FIG. 3 may be included in a separate ASIC die 350 in accordance with the teachings of the present invention. In the example, the pixel die 348 and ASIC die 350 are stacked and coupled together during fabrication to implement a time of flight sensing system in accordance with the teachings of the present invention.

Figure 4:
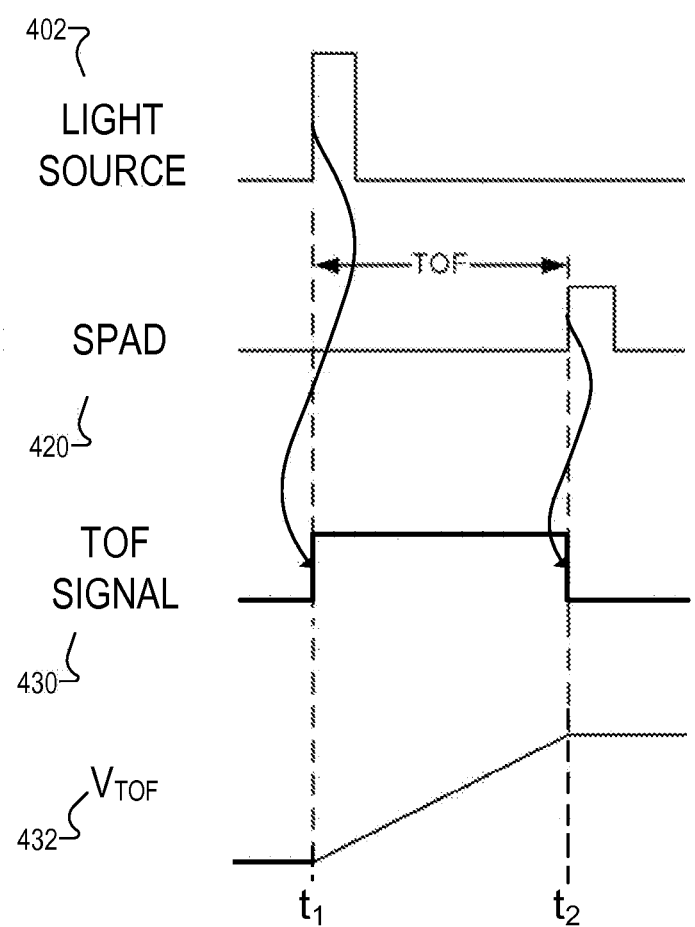
FIG. 4 is a timing diagram that shows an example of emitted light pulses, the respective reflected photons that are sensed by a photosensor, a time of flight signal representative of photon that is reflected from an object, and the corresponding voltage accumulated on a capacitor in an example time of flight pixel in accordance with the teachings of the present invention.

FIG. 4 is a timing diagram that shows an example an emitted light pulse from a light source 402, the respective reflected photons that are sensed by a SPAD 420, the time of flight signal 430 that is output by charging control logic, in response to the emitted light pulse 402 and sensed photon from SPAD 420 and the corresponding voltage $V_{TOF}$ accumulated on a capacitor $C_{TOF}$ 432 in an example time of flight pixel in accordance with the teachings of the present invention. It is appreciated that light source 402 may correspond for example with light source 102 of FIG. 1 and/or light source 202 of FIG. 2, that SPAD 420 may correspond for example with photosensor 320 of FIG. 3, that the time of flight TOF signal 430 may correspond for example with the time of flight TOF signal 330 of FIG. 3, that voltage $V_{TOF}$ 432 may correspond for example with the voltage $V_{TOF}$ accumulated in capacitor $C_{TOF}$ 332 of FIG. 3, and that similarly named and numbered elements referenced below are therefore coupled and function similar to as described above. As shown in the example, a light pulse is emitted at time $t_1$, which causes the TOF signal 430 to change from a logic low level to a logic high level, which therefore results in the voltage $V_{TOF}$ 432 to begin charging at time $t_1$.

FIG. 4 also illustrates that the SPAD 420 detects the photons that are reflected back from the object 106 at time $t_2$, which causes the TOF signal 430 to change from a logic high level to a logic low level, which therefore results in the voltage $V_{TOF}$ 432 to discontinue being charged at time $t_2$. The time of flight for the emitted light pulses to travel the round trip distance D back and forth between the light source and the photosensor is equal to the time between time $t_1$ and $t_2$ as illustrated in FIG. 4 in accordance with the teachings of the present invention. Accordingly, the voltage $V_{TOF}$ on capacitor $C_{TOF}$ 432 accumulates during the time of flight of the light pulses between time $t_1$ and time $t_2$. Since the voltage $V_{TOF}$ 432 increases at a linear rate because capacitor $C_{TOF}$ is charged with a constant current $I_H$ 328 from programmable current source 326 during the time of flight of the light pulses between time $t_1$ and time $t_2$, the voltage $V_{TOF}$ 432 can therefore be read out to determine the time of flight in accordance with the teachings of the present invention.

Figure 5:
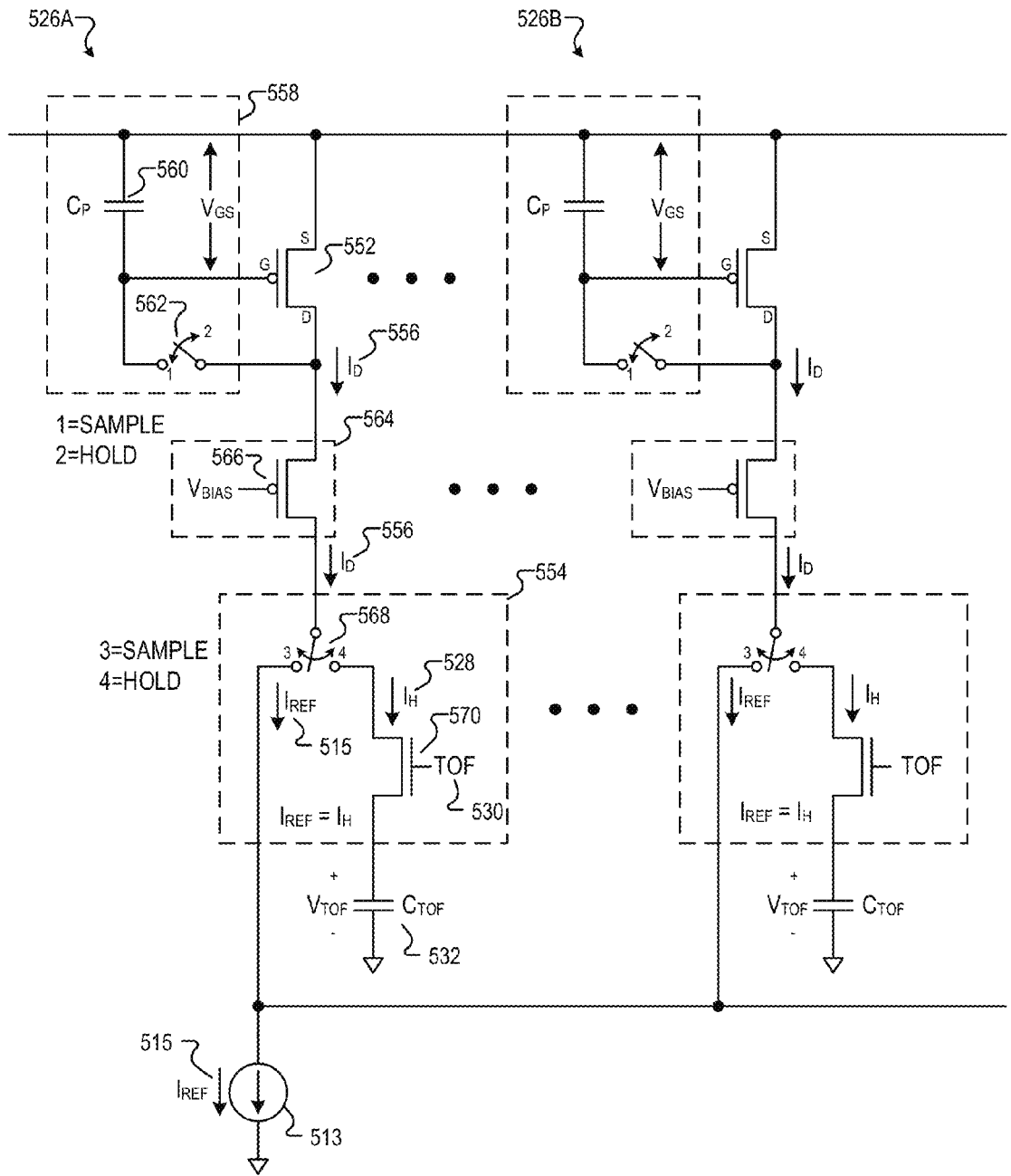
FIG. 5 is a schematic illustrating an example of programmable current sources included in a plurality of time of flight pixel cells coupled to a single reference current source in accordance with the teachings of the present invention.

FIG. 5 is a schematic illustrating an example of a plurality of programmable current sources included in a plurality of time of flight pixel cells coupled to a single reference current source in accordance with the teachings of the present invention. In particular, FIG. 5 shows a plurality of programmable current sources including for example programmable current source 526A and programmable current source 526B. In the illustrated example, it is appreciated each of the programmable current sources are substantially similar with one another, and that therefore only programmable current source 526A is discussed in detail herewith for brevity. It is also noted that programmable current source 526A and programmable current source 526B of FIG. 5 may be examples of programmable current source 326 of FIG. 3, and that similarly named and numbered elements referenced below are therefore coupled and function similar to as described above.

As shown in the depicted example, programmable current source 526A includes a first transistor 552. In the example depicted in FIG. 5, transistor 552 is illustrated as a p-channel metal oxide semiconductor field effect transistor (MOSFET), and therefore includes a gate terminal, a source terminal, and a drain terminal. It is appreciated that in other examples, other types of transistors may be used, such as for example an n-channel MOSFETs, a bipolar junction transistor (BJTs), or the like. In the depicted example, the drain current $I_D$ 556 through transistor 552 is responsive to a voltage difference between the gate terminal and the source terminal, which is illustrated as $V_{GS}$ in FIG. 5.

In one example, a current buffer circuit 564 may be coupled to the drain terminal of transistor 552 as shown. As such, the drain current $I_D$ 556 through transistor 552 is also conducted through current buffer circuit 564 as shown. In one example, current buffer circuit 564 includes a cascode coupled transistor 566 coupled to the drain terminal of transistor 552 as shown.

As shown in FIG. 5, programmable current source 526A also includes a current control circuit 554, which is coupled to conduct the drain current $I_D$ 556 from transistor 552. Current control circuit 554 is also coupled to reference current source 513 and coupled to time of flight capacitor $C_{TOF}$ 532. It is appreciated that reference current source 513 and time of flight capacitor $C_{TOF}$ 532 in FIG. 5 may be examples of reference current source 313 and time of flight capacitor $C_{TOF}$ 332, respectively, of FIG. 3, and that similarly named and numbered elements referenced below are therefore coupled and function similar to as described above.

In one example, current control circuit 554 includes switching circuitry 568, which is set to be in the "3" position during a sample operation. For instance, when switching circuitry is in the "3" position, the reference current source 513 is selectively coupled by switching circuitry 568 to force the reference current $I_{REF}$ 515 through the transistor 552 during a sample operation. As a result, the drain current $I_D$ 556 of transistor 552 is forced to be substantially equal to the reference current $I_{REF}$ 515 when the switching circuitry 568 is in the "3" position during a sample operation in accordance with the teachings of the present invention.

Continuing with the example depicted in FIG. 5, programmable current source 526A also includes a sample and hold circuit 558 coupled to transistor 552 as shown. Sample and hold circuit 558 is coupled to sample the gate-source voltage $V_{GS}$ of transistor during the sample operation. In addition, the sample and hold circuit 558 is coupled to hold the gate-source voltage $V_{GS}$ during a hold operation after the sample operation. In other words, the gate-source voltage $V_{GS}$ is held or maintained at a substantially equal value as the previously sampled gate-source voltage $V_{GS}$ in accordance with the teachings of the present invention.

As will be discussed, since the drain current $I_D$ 556 was forced to be substantially equal to reference current $I_{REF}$ 515 during the sample operation, the drain current $I_D$ 556 will remain substantially equal to the reference current $I_{REF}$ 515 during the hold operation while the gate-source voltage $V_{GS}$ is held to be at the same value as when the $V_{GS}$ was originally sampled with the drain current $I_D$ 556 forced to be substantially equal to the reference current $I_{REF}$ 515 in accordance with the teachings of the present invention.

In one example, sample and hold circuit 558 includes a programming capacitor $C_P$ 560 coupled between the source terminal and the gate terminal of transistor 552, and a switch 562 coupled between the gate terminal and the drain terminal of transistor 552 as shown. In operation, switch 562 is coupled to be ON, or in the "1" position as shown in FIG. 5, during the sample operation, and switch 562 is coupled to be OFF, or in the "2" position as shown in FIG. 5, during the hold operation of programmable current source 526A in accordance with the teachings of the present invention.

In particular, with switch 562 switched ON, or in the "1" position, and with transistor 552 operating in saturation during a sample operation, it is noted that the drain-gate voltage ($V_{DG}$) of transistor 552 is zero during the sample operation. As a result, the drain current $I_D$ 556 is a function of the gate-source voltage $V_{GS}$ during the sample operation. Since the drain current $I_D$ 556 is forced to equal the reference current $I_{REF}$ 515 during the sample operation, the reference current $I_{REF}$ 515 sets or programs the gate-source voltage $V_{GS}$ of transistor 552 during the sample operation to provide a drain current $I_D$ 556 that is substantially equal to the reference current $I_{REF}$ 515. This gate-source voltage $V_{GS}$ of transistor 552 is sampled by sample and hold circuit 558 and is held at that voltage by programming capacitor 560. Therefore, after the gate-source voltage $V_{GS}$ of transistor 552 is sampled, switch 562 is switched OFF, or in the "2" position, which holds the sampled $V_{GS}$ voltage across programming capacitor $C_P$, and therefore holds the drain current $I_D$ 556 to remain substantially equal to the reference current $I_{REF}$ 515 in accordance with the teachings of the present invention.

Continuing with the example, after the gate-source voltage $V_{GS}$ is sampled, and switch 562 is switched OFF, or in the "2" position, switching circuit 568 is then coupled to switch to from the "3" position to the "4" position during the hold operation, which directs the drain current $I_D$ 556 to be a constant programmed held current $I_H$ 528, which is conducted through switch 570. In the example, the held current $I_H$ 528 is coupled to selectively charge time of flight capacitor $C_{TF}$ 532 through switch 570 in response to the time of flight signal TOF 530 in accordance with the teachings of the present invention. Since the held current $I_H$ 528 is equal to the drain current $I_D$ 556 during the hold operation, the held current $I_H$ 528 is therefore substantially equal to the reference current $I_{REF}$ 515 in accordance with the teachings of the present invention.

As shown in the example depicted in FIG. 5, each one of the plurality of programmable current sources, including programmable current source 526A and programmable current source 526B, includes a respective current control circuit 554 that is coupled to the single reference current source 513 to selectively program the drain current $I_D$ 556 of the respective transistor 552. For instance, in operation, the respective current control circuit 554 of programmable current source 526B may activated to program programmable current source 526B after the programming of programmable current source 526A is complete.

As such, the single reference current source 513 may be utilized to program more than one programmable current source to provide substantially equal held currents $I_H$ 528 to charge respective time of flight capacitors $C_{TOF}$ 532 in accordance with the teachings of the present invention. For instance, in one example, the reference current $I_{REF}$ 515 of the single reference current source 513 may be utilized to program all of the programmable current sources in a time of flight pixel array in accordance with the teachings of the present invention.

It is noted that in the illustrated example, the reference current $I_{REF}$ 515 of the single reference current source 513 is utilized to program one programmable current source at a time. However, in another example, it is appreciated that the reference current $I_{REF}$ 515 of the single reference current source 513 may be utilized to program one or more other programmable reference current sources coupled to a time of flight pixel array, and that "copied" held reference currents of the other programmable reference current sources may then be utilized to quickly "copy" the original reference current $I_{REF}$ 515 value to the programmable current sources of one or more pixel cells throughout the time of flight pixel array in accordance with the teachings of the present invention. For instance, in one example, the distribution or spreading out of the "copy" operations of the reference current $I_{REF}$ 515 across multiple rows or columns of the time of flight pixel array may be realized to quickly copy the reference current $I_{REF}$ 515 in accordance with the teachings of the present invention.

Figure 6:
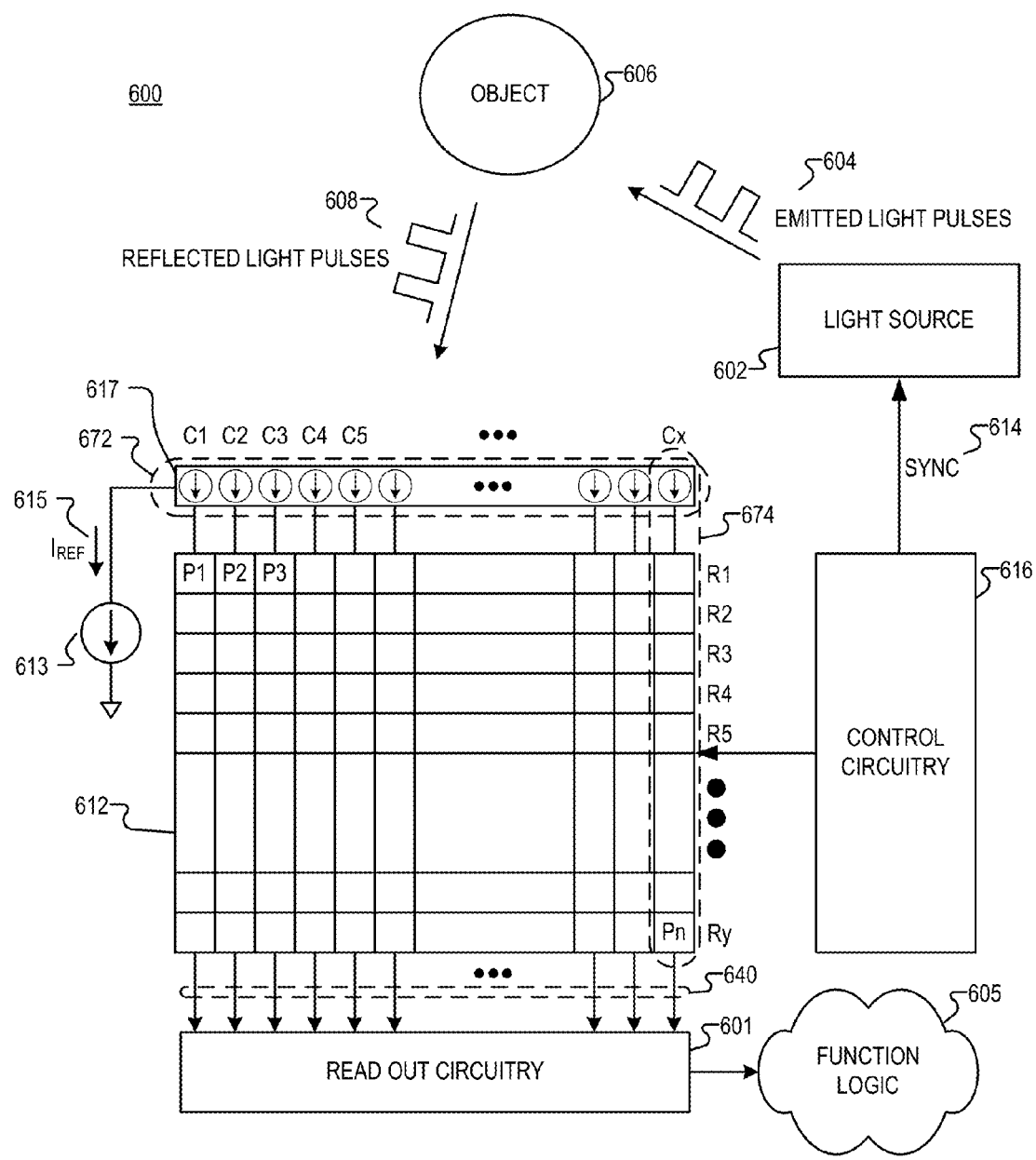
FIG. 6 is a block diagram that shows a portion of an example time of flight sensing system including a time of flight pixel array with corresponding readout circuitry, control circuitry and function logic in accordance with the teachings of the present invention.

To illustrate, FIG. 6 is block diagram that shows a portion of an example time of flight sensing system 600 including a time of flight pixel array with corresponding readout circuitry, control circuitry and function logic in accordance with the teachings of the present invention. As shown, the illustrated example of time of flight sensing system 600 includes a time of flight pixel array 612, read out circuitry 601, array of programmable reference current sources 617, function logic 605, control circuitry 616, and a light source 602 to sense the round trip distance to object 606 in accordance with the teachings of the present invention.

In the example illustrated in FIG. 6, pixel array 612 is a two dimensional (2D) array of time of flight pixel cells (e.g., pixels P1, P2, . . . , Pn). In one example, each of the time of flight pixel cells P1, P2, . . . , Pn may be substantially similar to one of the time of flight pixels discussed above, for example in FIGS. 2-5, and that similarly named and numbered elements referenced below are therefore coupled and function similar to as described above. As illustrated, each pixel cell is arranged into a row (e.g., rows R1 to Ry) and a column (e.g., column C1 to Cx) to acquire time of flight information of an image object 606 focused onto pixel array 612. Thus, the time of flight information can then be used to determine the distance or depth information to the object 606 in accordance with the teachings of the present invention.

As shown in the example depicted in FIG. 6, a single reference current source 613 having a reference current $I_{REF}$ 615 is coupled to the array of programmable reference current sources 617. In one example, the array of programmable reference current sources 617 includes a plurality of programmable reference current sources, each of which may be substantially similar to the example programmable current source discussed above in FIG. 5. For instance, in the example depicted in FIG. 6, it is appreciated that after the reference current $I_{REF}$ 615 has been copied to each of the programmable reference current sources included in the array of programmable reference current sources 617, each of the "copied" reference current sources in the array of programmable reference current sources 617 is coupled to program each of the internal programmable current sources included in a respective column of pixels cells of the array of time of flight pixel cells as discussed above. By using the original reference current $I_{REF}$ 615, the "copied" held reference currents $I_H$ provided to each internal programmable current source included in the array of time of flight pixel cells is individually calibrated to be substantially equal, even with pixel-by-pixel variations that may occur across all of the transistors that are included in the array of time of flight pixel cells in accordance with the teachings of the present invention.

To illustrate, the reference current $I_{REF}$ 615 of reference current source 613 is copied in a column copying loop 672 to each of the programmable reference current sources included in the array of programmable reference current sources 617. In the example, each of the programmable reference current sources included in the array of programmable reference current sources 617 is coupled to a corresponding one of the columns of pixel cells in the time of flight pixel array 612. The copied held reference currents $I_H$ that were copied from the reference current $I_{REF}$ 615 into each of the programmable reference current sources included in the array of programmable reference current sources 617 may then be copied for each column in a row copying loop 674 as shown, to quickly copy all of the held reference currents $I_H$ throughout all of the rows of pixel cells in the pixel array 612 in accordance with the teachings of the present invention. In the illustrated example, in which the time of flight pixel array 612 includes x columns and y rows, the reference current $I_{REF}$ 615 is copied into each of the x number of programmable reference current sources in array of programmable reference current sources 617 during the column copying loop 672. Once programmed, each of the programmable reference current sources included in the array of programmable reference current sources 617 provides a reference current, which is then copied to each of the y number of rows of time of flight pixel array 612 in accordance with the teachings of the present invention.

In other words, during the first x current copying cycles, the reference current $I_{REF}$ 615 is used to copy the reference current to each of the x programmable reference current sources in the array of programmable reference current sources 617. During the (x+1) to (x+y) current copying cycles, each of the copied reference currents in the array of programmable reference current sources 617 is copied to the programmable current sources in each of the y rows of time of flight pixel array 612 in accordance with the teachings of the present invention.

In one example, control circuitry 616 controls and synchronizes light source 602 with a sync signal 614 to emit light pulses 604 to object 606. The reflected back light pulses 608 are then reflected back to pixel array 612 as shown. In one example, each one of the pixel cells in pixel array 612 senses the photons from the reflected back light pulses 608, and the corresponding signals responsive to the measured $V_{TOF}$ voltages from the respective $C_{TOF}$ capacitors included in the pixel cells in pixel array 612 are then read out by read out circuitry 601 through bitlines 640 as shown. In one example, read out circuitry 601 may include amplifiers to further amplify the signals received through bitlines 640. In one example, the information read out by read out circuitry 601 may then be transferred to function logic 605. In one example, function logic 605 may determine the time of flight and distance information for each pixel cell. In one example, function logic 605 may also store the time of flight information and/or even manipulate the time of flight information (e.g., crop, rotate, adjust for background noise, or the like). In one example, read out circuitry 601 may read out an entire row of time of flight information at a time along the bitlines 640 (illustrated), or in another example may read out the time of flight information using a variety of other techniques (not illustrated), such as a serial readout or a full parallel readout of all pixel cells simultaneously.

In the illustrated example, control circuitry 616 is further coupled to pixel array 612 to control the operation of pixel array 612, as well as synchronize the operation of pixel array 612 with light source 602. For example, control circuitry 616 may generate the timing signals 315 coupled to be received by the charging control logic 322, as well as the output switch 342 and row select switch 343 shown in FIG. 3 to determine the time of flight information in accordance with the teachings of the present invention.

In one example, it is noted that time of flight sensing system 600 illustrated in FIG. 6 may be implemented in a stacked chip scheme. For instance, as shown in the example, pixel array 612 may be included in a pixel die, while read out circuitry 601, function logic 605, and control circuitry 616, as illustrated in FIG. 6, may be included in a separate ASIC die in accordance with the teachings of the present invention. In the example, the pixel die and ASIC die are stacked and coupled together during fabrication to implement a time of flight sensing system in accordance with the teachings of the present invention.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A programmable current source array having a plurality of programmable current sources, wherein each one of the plurality of program current sources is used with a corresponding time of flight pixel cell, and comprises:
    a first transistor having a gate terminal, a source terminal, and a drain terminal, wherein a current through the first transistor is responsive to a gate-source voltage of the first transistor;
    a current control circuit coupled to the first transistor and coupled to a reference current source, wherein the current control circuit is coupled to selectively couple a reference current of the reference current source through the first transistor during a sample operation; and
    a sample and hold circuit coupled to the first transistor, wherein the sample and hold circuit is coupled to sample a gate-source voltage of the first transistor during the sample operation, wherein the sample and hold circuit is coupled to hold the gate-source voltage during a hold operation after the sample operation substantially equal to the gate-source voltage during the sample operation, wherein a hold current through the first transistor during the hold operation is substantially equal to the reference current,
    wherein the reference current source is a single reference current source coupled to program each one of the plurality of current sources during the sample operation of each one of the plurality of programmable current sources.

2. The programmable current source of claim 1 wherein the sample and hold circuit comprises:
    a programming capacitor coupled between the source terminal and the gate terminal of the first transistor; and
    a switch coupled between the gate terminal and the drain terminal of the first transistor, wherein the switch is coupled to be ON during the sample operation, and OFF during the hold operation.

3. The programmable current source of claim 1 further comprising a current buffer circuit coupled to the drain terminal of the first transistor, wherein the current through the first transistor is conducted through the current buffer circuit.

4. The programmable current source of claim 3 wherein the current buffer circuit comprises a cascode coupled transistor coupled to the drain terminal of the first transistor.

5. The programmable current source of claim 1 wherein the current control circuit is further coupled to a time of flight capacitor of the time of flight pixel cell, wherein the current control circuit is coupled to selectively charge the time of flight capacitor with the hold current during a time of flight measurement operation of the time of flight pixel cell.

6. The programmable current source of claim 1 wherein each one of the plurality of current sources is included in a respective one of a plurality of time of flight pixel cells.

7. A time of flight pixel cell, comprising:
    a photosensor to sense photons reflected from an object; and
    a pixel support circuit including:
        timing control logic coupled to the photosensor to detect when the photosensor senses the photons reflected from the object, wherein the timing control logic is further coupled to receive timing signals representative of when light pulses are emitted from a light source to the object, wherein the timing control logic is coupled to generate a time of flight signal representative of a time of flight measurement operation of the time of flight pixel cell;
        a programmable current source coupled to the timing control logic to provide a hold current in response to the time of flight signal coupled to be received from the timing control logic, wherein the programmable current source includes:
            a first transistor having a gate terminal, a source terminal, and a drain terminal, wherein a current through the first transistor is responsive to a gate-source voltage of the first transistor;
            a current control circuit coupled to the first transistor and coupled to a reference current source, wherein the current control circuit is coupled to selectively couple a reference current of the reference current source through the first transistor during a sample operation; and a sample and hold circuit coupled to the first transistor, wherein the sample and hold circuit is coupled to sample a gate-source voltage of the first transistor during the sample operation, wherein the sample and hold circuit is coupled to hold the gate-source voltage during a hold operation after the sample operation substantially equal to the gate-source voltage during the sample operation, wherein a hold current through the first transistor during the hold operation is substantially equal to the reference current; and a time of flight capacitor coupled to the current control circuit to be selectively charged by the hold current in response to the time of flight signal, wherein a voltage on the time of flight capacitor is representative of a round trip distance to the object.

8. The time of flight pixel cell of claim 7 wherein the time of flight signal is coupled to be representative of the time of flight of each one of the light pulses emitted from the light source until the photosensor senses a respective one of the photons reflected from the object.

9. The time of flight pixel cell of claim 7 wherein the sample and hold circuit comprises:
   a programming capacitor coupled between the source terminal and the gate terminal of the first transistor; and
   a switch coupled between the gate terminal and the drain terminal of the first transistor, wherein the switch is coupled to be ON during the sample operation, and OFF during the hold operation.

10. The time of flight pixel cell of claim 7 wherein the programmable current source further comprises a current buffer circuit coupled to the drain terminal of the first transistor, wherein the current through the first transistor is conducted through the current buffer circuit.

11. The time of flight pixel cell of claim 10 wherein the current buffer circuit comprises a cascode coupled transistor coupled to the drain terminal of the first transistor.

12. The time of flight pixel cell of claim 7 wherein the pixel support circuit further comprises an amplifier coupled to the time of flight capacitor to read out the voltage on the time of flight capacitor after being charged by the programmable current source in response to the time of flight signal.

13. The time of flight pixel cell of claim 12 wherein the pixel support circuit further comprises a reset circuit coupled to reset the voltage on the time of flight capacitor after the voltage on the time of flight capacitor is read out.

14. The time of flight pixel cell of claim 12 wherein the pixel support circuit further comprises an output switch coupled between the time of flight capacitor and a gate of the amplifier.

15. The time of flight pixel cell of claim 12 wherein the pixel support circuit further comprises a row select switch coupled between an output of the amplifier and a bitline.

16. The time of flight pixel cell of claim 7 wherein the photosensor comprises a single photon avalanche diode (SPAD).

17. The time of flight pixel cell of claim 7 wherein the photosensor is included in a first die and wherein the pixel support circuit is included in a second die, wherein the first die and the second die are stacked and coupled together.

18. A time of flight sensing system, comprising:
   a light source to emit light pulses to an object;
   a reference current source having a reference current;
   a time of flight pixel array having a plurality of time of flight pixel cells, wherein each one of the time of flight pixel cells comprises:
      a photosensor to sense photons reflected from the object;
      timing control logic coupled to the photosensor to detect when the photosensor senses the photons reflected from the object, wherein the timing control logic is further coupled to receive timing signals representative of when light pulses are emitted from the light source to the object, wherein the timing control logic is coupled to generate a time of flight signal representative of a time of flight measurement operation of the time of flight pixel array;
      a programmable current source coupled to the timing control logic to provide a hold current in response to the time of flight signal coupled to be received from the timing control logic, wherein the programmable current source includes:
         a first transistor having a gate terminal, a source terminal, and a drain terminal, wherein a current through the first transistor is responsive to a gate-source voltage of the first transistor;
         a current control circuit coupled to the first transistor and coupled to the reference current source, wherein the current control circuit is coupled to selectively couple the reference current of the reference current source through the first transistor during a sample operation; and
         a sample and hold circuit coupled to the first transistor, wherein the sample and hold circuit is coupled to sample a gate-source voltage of the first transistor during the sample operation, wherein the sample and hold circuit is coupled to hold the gate-source voltage during a hold operation after the sample operation substantially equal to the gate-source voltage during the sample operation, wherein a hold current through the first transistor during the hold operation is substantially equal to the reference current;
      a time of flight capacitor coupled to the current control circuit to be selectively charged by the hold current in response to the time of flight signal, wherein a voltage on the time of flight capacitor is representative of a round trip distance to the object;
   control circuitry coupled to the light source and to the time of flight pixel array to synchronize a timing of the emission of the light pulses with the sensing of the photons reflected from the object.

19. The time of flight sensing system of claim 18 wherein the time of flight signal is coupled to be representative of the time of flight of each one of the light pulses emitted from the light source until the photosensor of a respective one of the plurality time of flight pixel cells senses a respective one of the photons reflected from the object.

20. The time of flight sensing system of claim 18 wherein the sample and hold circuit comprises:
   a programming capacitor coupled between the source terminal and the gate terminal of the first transistor; and
   a switch coupled between the gate terminal and the drain terminal of the first transistor, wherein the switch is coupled to be ON during the sample operation, and OFF during the hold operation.

21. The time of flight sensing system of claim 18 wherein the programmable current source further comprises a current buffer circuit coupled to the drain terminal of the first transistor, wherein the current through the first transistor is conducted through the current buffer circuit.

22. The time of flight sensing system of claim 18 wherein the current buffer circuit comprises a cascode coupled transistor coupled to the drain terminal of the first transistor.

23. The time of flight sensing system of claim 18 wherein each one of the time of flight pixel cells further comprises an amplifier coupled to the time of flight capacitor to read out the voltage on the time of flight capacitor after being charged by the programmable current source in response to the time of flight signal.

24. The time of flight sensing system of claim 23 wherein each one of the time of flight pixel cells further comprises a reset circuit coupled to reset the voltage on the time of flight capacitor after the voltage on the time of flight capacitor is read out.

25. The time of flight sensing system of claim 23 wherein each one of the time of flight pixel cells further comprises an output switch coupled between the time of flight capacitor and a gate of the amplifier.

26. The time of flight sensing system of claim 23 wherein each one of the time of flight pixel cells further comprises a row select switch coupled between an output of the amplifier and a bitline.

27. The time of flight sensing system of claim 26 further comprising read out circuitry coupled to read out the voltage from each one of the time of flight pixel cells through the bitline.

28. The time of flight sensing system of claim 27 further comprising function logic coupled to the read out circuitry to store and process time of flight information read out from the time of flight pixel array.

29. The time of flight sensing system of claim 18 wherein the photosensor comprises a single photon avalanche diode (SPAD).

* * * * *